Fig. 1

INVENTORS
Douglas W. Hilchie
Joseph Zemanek, Jr.
BY Arthur F. Zobal
ATTORNEY

INVENTORS
Douglas W. Hilchie
Joseph Zemanek, Jr.
BY
Arthur J. Zobal
ATTORNEY

Fig. 8

United States Patent Office 3,550,075
Patented Dec. 22, 1970

3,550,075
SYSTEM FOR DISPLAYING TIME INFORMATION
IN ACOUSTIC WELL LOGGING SYSTEM
Douglas W. Hilchie, Butte, Mont., and Joseph Zemanek, Jr., Dallas, Tex., assignors to Mobil Oil Corporation, a corporation of New York
Filed Oct. 24, 1968, Ser. No. 770,201
Int. Cl. G01r 29/04
U.S. Cl. 340—15.5                    12 Claims

ABSTRACT OF THE DISCLOSURE

The specification discloses a directional acoustic transducer supported for rotation in a borehole and operated periodically to transmit acoustic pulses to the borehole wall and to detect reflected acoustic energy. Circuitry is employed to produce output signals having an amplitude inversely proportional to the time between the transmission of acoustic pulses and the detection of reflected acoustic energy. These output signals are applied to an oscilloscope to modulate the intensity of its electron beam which is swept across the screen of the scope once for each rotation of the transducer. The intensity of the trace obtained varies as a function of the two-way travel time whereby a variable-density presentation, representative of distance, is obtained of the borehole configuration.

BACKGROUND OF THE INVENTION

This invention relates to a system for obtaining a variable-density presentation of the configuration of a borehole.

In United States Pat. No. 3,369,626, there is disclosed an acoustic borehole logging technique and system wherein the walls of a borehole are scanned periodically with acoustic energy for obtaining information of interest. In one embodiment, a single transducer which acts both as a transmitter and receiver is rotated in the borehole and periodically actuated to produce acoustic pulses which are applied to the borehole wall. Reflected energy is detected by the transducer between acoustic pulses and converted into receiver signals which are employed to intensity modulate the electron beam of an oscilloscope which is swept across the screen of the oscilloscope once for each rotation of the transducer. Successive traces are produced representative of the borehole wall anomalies or fractures as sensed by the rotating transducer. Each successive trace is photographed by suitable means for the production of a two-dimension, flat record of the surface of the borehole wall.

In one embodiment, the modulating signals have amplitudes dependent upon the energy of reflected acoustic pulses detected whereby the resulting picture has tones of white, gray, and black. The tones of the picture primarily represent the type of reflecting surface, i.e., weak or strong, or the absence of a reflecting surface if fractures are present. Such pictures hence are very useful in locating and defining fractures in the formations.

In certain instances, information also is desired as to the time or distance between the transducer and the reflecting surface as the transducer is rotated in the borehole. Moreover, this information is desired in a form which may be easily and rapidly interpreted upon a visual inspection.

SUMMARY OF THE INVENTION

In accordance with the present invention, there is provided, in a logging system having a rotating acoustic transducing means which is periodically pulsed, a novel system and technique for obtaining a variable-density record or display which reflects the time or distance between the rotating transducer and the reflecting surface and hence reflects the borehole configuration. The system comprises means for periodically producing signals having an amplitude which is a function of the time between the production of pulses of acoustic energy and the detection of the reflected energy. Also provided is a utilization device including a visual recording medium for sequentially recording data in a variable-density form and representative of the output of the transducer means through 360° of rotation of the transducer means in the borehole. The amplitude signals are applied to the utilization device for the production of a variable-density record wherein variation in tones represents different distances or times between the transducer and the borehole reflecting surface.

In the embodiment disclosed, the utilization device comprises an oscilloscope wherein an electron beam is swept across the screen for each rotation of the transducer. The amplitude signal modulates the intensity of the electron beam in a manner wherein the intensity thereof is an inverse function of the time between the production of acoustic pulses and the detection of reflected acoustic energy.

DESCRIPTION OF THE BOREHOLE LOGGING SYSTEM

Figure 1:
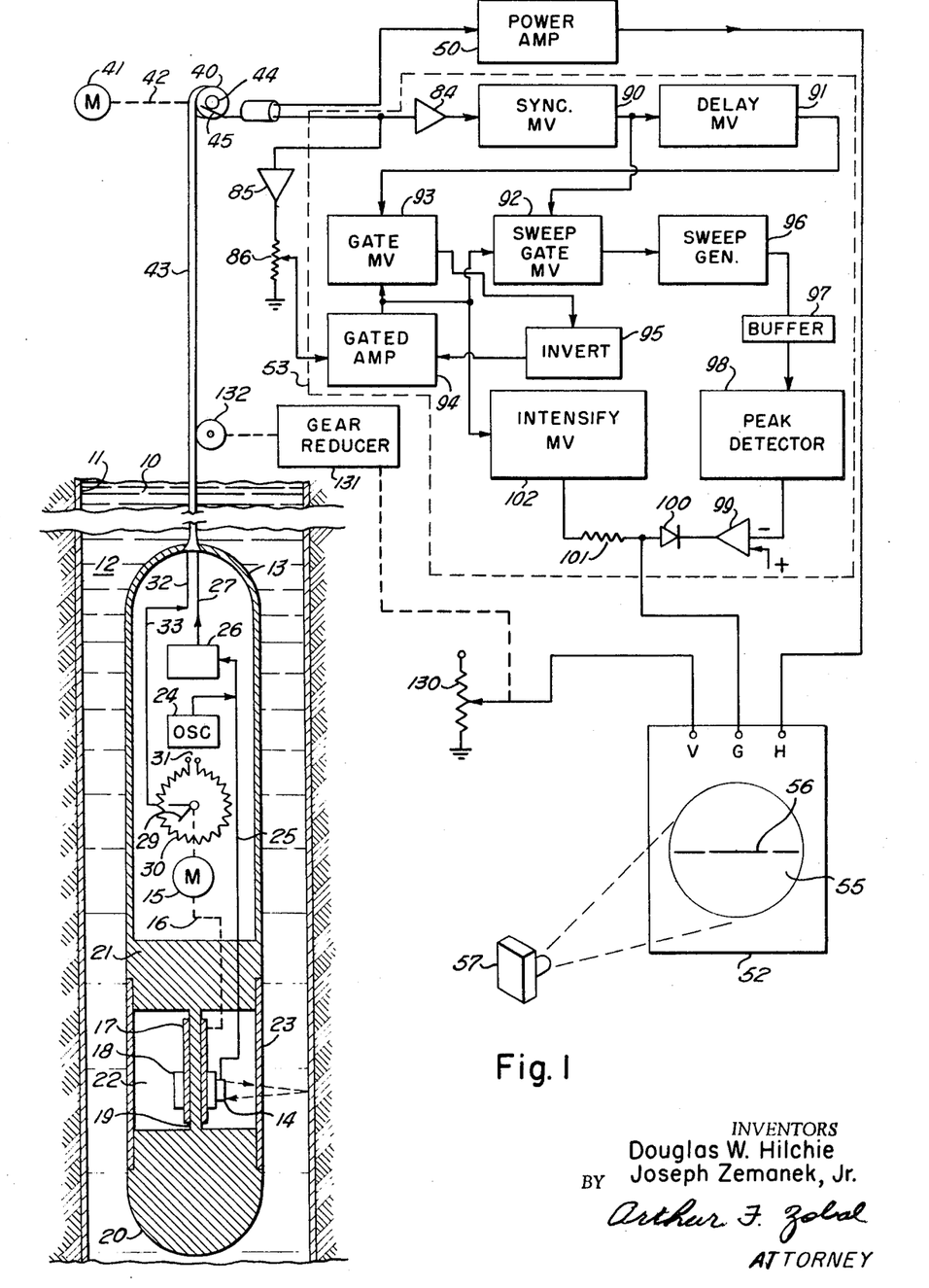
FIG. 1 illustrates the present invention employed in combination with an acoustic well logging tool.

Referring now to FIG. 1, there will be described briefly one type of borehole logging system with which the present invention may be employed. The logging system will be described in the preferred embodiment as one for carrying out casing inspection. Although with certain modifications, it can be employed for carrying out open hole logging. The borehole 10 to be logged is lined with metal casing 11 and contains borehole fluid 12. The borehole logging system comprises a borehole tool 13 having an acoustic transducer 14 which acts as a transmitter and receiver of acoustic energy. During logging operations, the transducer 14 is rotated through 360° at a rate of about 180 revolutions per minute by motor 15, mechanical drive 16 (described in detail in U.S. Pat. No. 3,379,077), sleeve 17, and transducer mount 18. The sleeve 17 rotates about mandrel 19 which connects end member 20 to structure 21. During each 360° cycle, the transducer 14 is pulsed periodically at a rate of about 2,000 pulses per second for the application of acoustic pulses to the borehole wall by way of tool fluid 22, rubber boot 23, and the borehole fluid 12. Oscillator 24, which is coupled to the transducer 14 by way of conductor 25 and slip rings (not shown) periodically actuates the transducer for the production of acoustic pulses. Between the production of acoustic pulses, reflected energy is detected by the transducer 14 and applied to the surface by way of conductor 25, gating and amplifying circuitry 26, and cable conductor 27. Sync pulses are obtained from the transducer 14, when it is actuated, and also are applied to conductor 27.

Also rotated by motor 15 is the arm 29 of a potentiometer 30 which has a voltage applied across its terminals 31 from a source (not shown). The voltage obtained at the arm 29, as it rotates, is a sawtooth wave whose period is equal to the period of revolution of the transducer 14. This sawtooth voltage is applied to cable conductor 32 by way of conductor 33 for transmission to the surface.

During logging operations, drum 40, driven by motor 41 and connection 42, winds and unwinds the supporting cable 43 to move the tool 13 continuously through the borehole. At the surface, the various pulses and signals are taken from the cable conductors by way of slip rings and brushes illustrated, respectively, at 44 and 45.

The sawtooth voltage is applied by power amplifier 50 to the horizontal deflection plate of oscilloscope 52. The sawtooth voltage thus sweeps the scope's electron beam when it is ON.

DESCRIPTION OF THE PRESENT INVENTION

Figure 2:
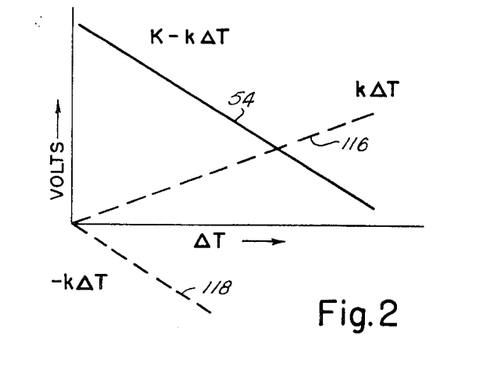
FIG. 2 illustrates a curve useful in understanding the present invention.

The output signals of the transducer 14, representative of acoustic energy reflected from the wall of the borehole, are applied to circuitry illustrated in block diagram shown located within the dashed configuration 53. This circuitry converts the output signal to intensity-modulating signals having amplitudes which are a function of the time between the transmission of acoustic pulses and the reception of reflected acoustic energy. The relationship between the modulating signal amplitude and time is illustrated by the curve 54 in FIG. 2. The term $\Delta T$ represents two-way travel time between the transducer and the reflecting interface. As can be seen, the modulating signal amplitude decreases as the travel time increases.

The output signals from the circuitry 53 are applied to the grid of the oscilloscope 52 to intensity modulate the electron beam as it sweeps across the screen 55. Thus, during each rotational cycle of the transducer 14 there is produced across the dark screen 55 of the oscilloscope 52 an illuminating trace 56 which has a variable intensity. Successive traces are stepped vertically as a function of tool position in the borehole and photographed by a camera 57 for the production of a two-dimensional print or display of successive traces and which display is a variable-density presentation of a folded-out section of the borehole configuration as scanned from inside the borehole. This presentation is representative of distance or travel time between the transducer and the reflecting surface.

Figure 3:
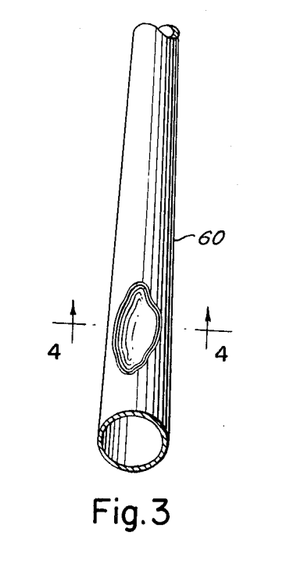
FIG. 3 illustrates a portion of a casing which was partially collapsed intentionally.
Figure 4:
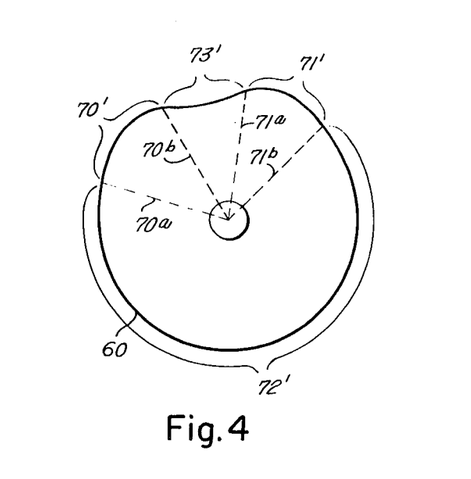
FIG. 4 illustrates a cross section of the casing taken along the lines 4—4 of FIG. 3.
Figure 5:
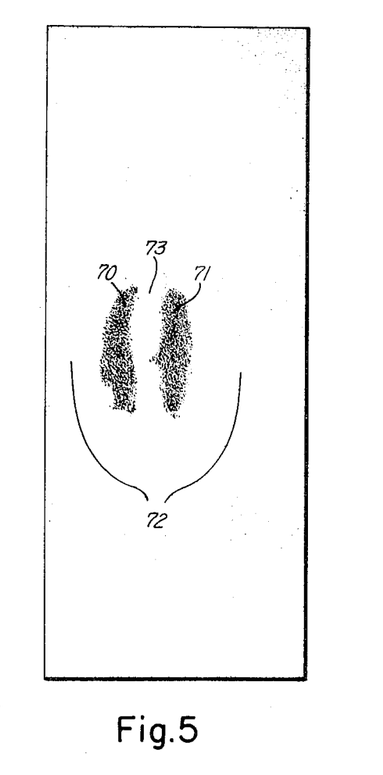
FIG. 5 illustrates a picture of the interior of the casing of FIG. 3 as expected to be obtained with the system of the present invention.

FIG. 5 illustrates such a presentation expected in logging the partially collapsed casing 60 of FIG. 3. FIG. 4 illustrates a cross section of the casing taken along the lines 4—4 of FIG. 3. As can be seen in FIG. 5, the darker tones of areas 70 and 71 reflect that the corresponding casing sections 70' and 71', respectively, defined between radial lines 70a–70b and 71a–71b of FIG. 4, are further from the transducer than the casing section 72', defined between radial lines 71b–70a of FIG. 4. In addition, the area 73 in FIG. 5 and corresponding to the casing section 73', defined between radial lines 70b–71a of FIG. 4, has a tone lighter than areas 70–72, indicating that section 73' is closer to the transducer.

Thus, it can be seen that the variable-density presentation representative of time or distance is very useful and effective in allowing one to determine borehole configuration and to obtain a measure of the extent of deviation of the borehole from a circular configuration. This is of importance particularly in casing inspection to determine if the casing has burst, collapsed, or partially collapsed. This type of presentation also has usefulness in open hole logging to determine, for example, if the borehole deviates from circular form.

Figure 6:
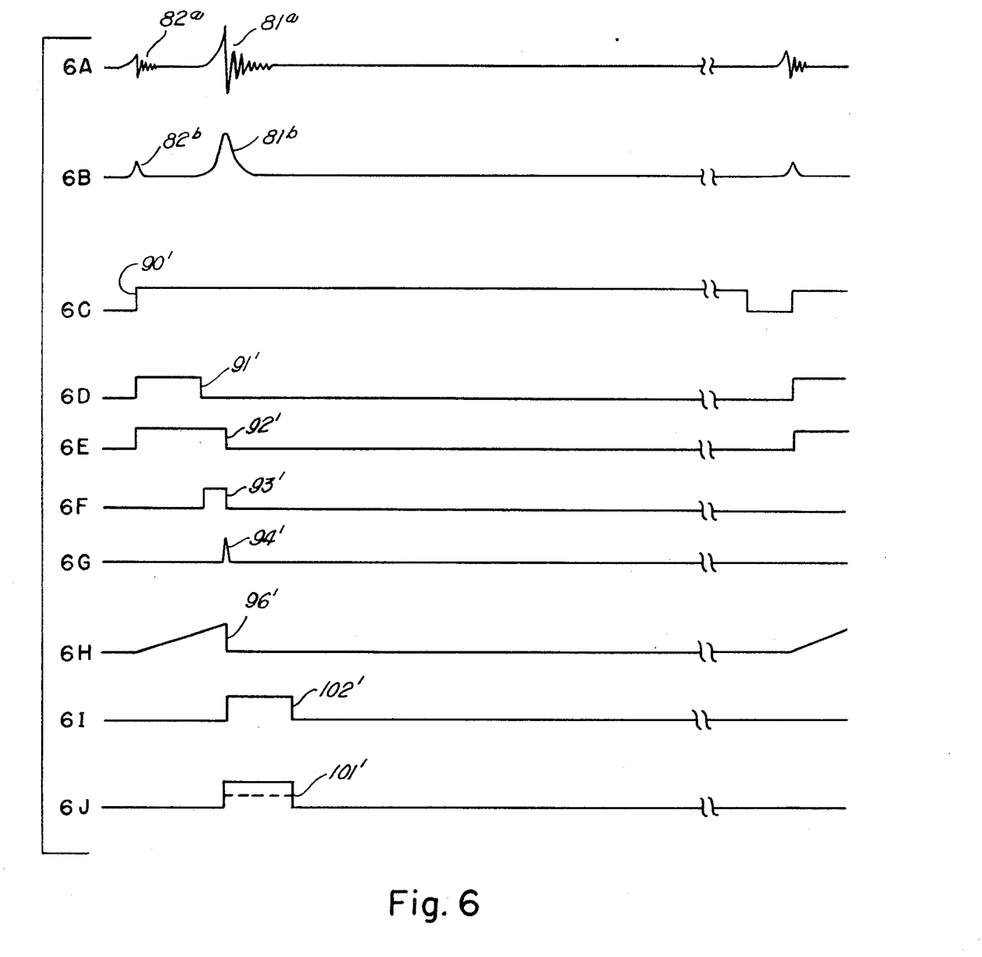
FIGS. 6A–6J illustrate waveforms useful in understanding the present invention.

Referring again to FIG. 1 and to FIGS. 6A–6J, there will be described briefly the block diagram system employed for converting time to amplitude for intensity modulating the electron beam of the oscilloscope. The output of the transducer 14, representative of reflected acoustic energy, is illustrated at 81a in FIG. 6A. The pulse shown at 82a represents a portion of the output produced by the transducer 14 when it is actuated and which is employed as a sync pulse. The downhole circuitry illustrated in block diagram 26 (FIG. 1) detects the resulting signals to form signals 81a and 82a the envelope signals 81b and 82b (FIG. 6B), respectively, for transmission to the surface. At the surface, the sync pulses and signals representative of reflected acoustic energy are applied to system 53 by way of amplifiers 84 and 85, respectively, which also act as inverters. Potentiometer 86 is employed to control the level of the acoustic signal applied to system 53. The sync pulses trigger sync monostable multivibrator 90 for the production of output pulses illustrated at 90' in FIG. 6C. Delay multivibrator 91 and sweep gate multivibrator 92, whose outputs are illustrated at 91' and 92', respectively, in FIGS. 6D and 6E, are triggered coincidentally by a pulse coincident with the leading edge of pulse 90'. This triggering pulse is obtained by differentiating pulse 90'. The output of multivibrator 91 is differentiated and a spike obtained from the trailing edge of signal 91' is employed to trigger monostable multivibrator 93 for the production of a signal illustrated at 93' in FIG. 6F. The signal from amplifier 85 representative of reflected acoustic energy is applied to amplifier 94. The output of multivibrator 93 is applied to amplifier 94 by way of inverter 95 to open the amplifier 94 and allow the passage of the signal from the amplifier 85 to multivibrator 93 for the production of pulse 94', shown in FIG. 6G. This pulse shuts off multivibrator 93 whereby its output terminates at the beginning of pulse 94' and consequently the output of amplifier 94 is terminated so that the pulse 94' is of very short duration. The output pulse 94' also is employed to shut off multivibrator 92 whereby its pulse 92' terminates at the termination of pulse 94'. Pulse 92' in turn is applied to sweep generator 96 for the production of a sawtooth waveform 96' (FIG. 6H) which begins at the occurrence of sync pulse 82b and terminates at the beginning of the receiver pulse 81b. The output of sweep generator 96 is applied, by way of buffer 97, to peak detector 98 which produces a D-C voltage having a magnitude proportional to the peak voltage obtained by the sawtooth wave 96'. The magnitude of the D-C voltage thus is proportional to $\Delta T$. It is inverted and operated on by amplifier 99 for the production of a D-C voltage whose magnitude is an inverse function of $\Delta T$. The output of amplifier 99 is applied as a reference voltage to a clamping circuit comprising diode 100 and resistor 101, the latter of which is coupled to multivibrator 102. This multivibrator is triggered periodically by pulses 94' for the production of constant-amplitude, constant-width pulses 102' (FIG. 6I) which are applied to resistor 101. The output taken from between diode 100 and resistor 101 comprises pulses 101' (FIG. 6J) whose heights are equal to the magnitude of the D-C reference and hence are an inverse function of $\Delta T$. These pulses are applied to the grid of the oscilloscope 52 to produce an electron beam and hence a trace 56 of higher intensity when $\Delta T$ decreases and an electron beam of lower intensity when $\Delta T$ increases.

Figure 7:
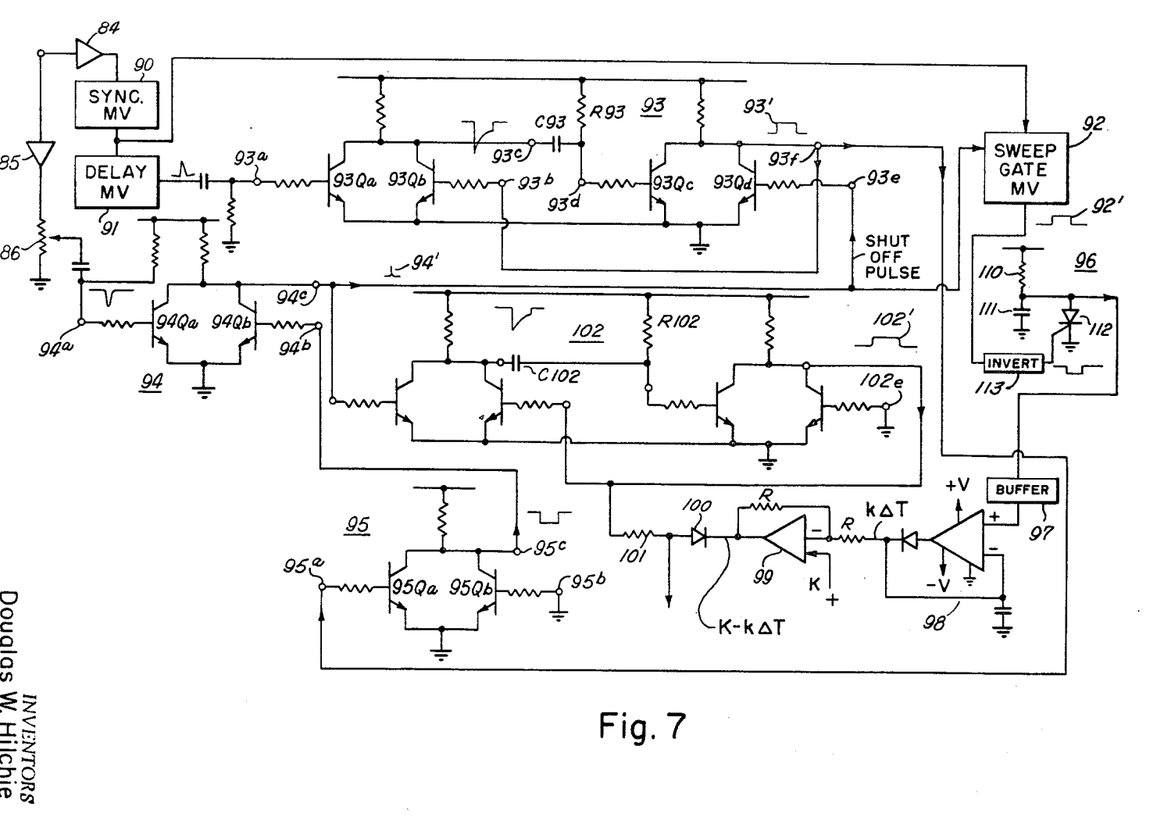
FIG. 7 illustrates in detail circuitry of the present invention.

Referring now to FIG. 7, there will be described in detail the circuitry for converting time to amplitude pulses. The components forming the amplifiers and multivibrators consist essentially of a number of dual input gates, each gate formed by two NPN transistors and associated resistors. These gates are available commercially from Fairchild Semiconductor, Mountain View, Calif., and are identified as $\mu$L–914. The gates are formed in modules or packages, each module having two pairs of gates. The modules have a number of connecting terminals for coupling purposes to obtain the desired operation.

The gates individually may be operated as negative logic NAND gates whereby an output is produced if two negative inputs are applied thereto simultaneously. For example, transistors 94Qa and 94Qb are coupled together to form the amplifier 94 which has two input terminals 94a and 94b and one output terminal 94c. If either one of these transistors is placed in a conductive state by the application of a positive signal to inputs 94a or 94b, then a low-level or zero signal is obtained from output 94c regardless of the input applied to the other transistor. On the other hand, a positive signal will be obtained from output 94c only if both of these transistors are placed in a nonconductive state by the application of a negative voltage of a certain level to the input 94a and input 94b. Normally, the signals applied to inputs 94a and 94b are at a high or positive level whereby the transistors 94Qa and 94Qb are conducting and a low-level or zero signal is obtained from output 94c. During the production of a signal from multivibrator 93, the output from amplifier or inverter 95 is negative and is applied to the input 94b. Transistor 94Qb thus is cut OFF and transistor 94Qa has control of the output. A negative signal of a certain level that appears at its input 94a will result in the production of a positive signal at the output 94c. Thus, when a negative signal, representative of reflected acoustic energy, is obtained from amplifier-inverter 85 and potentiometer 86 and applied to input 94a coincidentally with the production of a negative signal from inverter 95, a positive signal will be produced at 94c.

This output signal is applied to multivibrators 92, 93, and 102 as indicated above. Multivibrator 93 comprises transistor pair 93Qa–93Qb coupled to transistor pair 93Qc–93Qd by way of RC timing capacitor $C_{93}$ and resistor $R_{93}$. Input 93a and output 93f and hence input 93b normally are at a low level whereby output 93c is normally at a high level. Moreover, input 93e normally is low and control of transistor pair 93Qc–93Qd is through transistor 93Qc. A positive pulse coincident with the trailing edge of pulse 91' from delay multivibrator 91 when applied to input 93a initiates the multivibrator action and causes output 93c to decrease. The input at 93d decreases and transistor 93Qc is turned OFF. Hence, output 93f increases. Output 93f is applied back to the input 93b to control transistor pair 93Qa–93Qb and keep the output 93c down during the RC action. If the width of the pulse at 93f were controlled only by the RC action, the output at 93f would remain high until sufficient charge leaks off of capacitor $C_{93}$. Transistor 93Qc then would conduct, output 93f would decrease, and output 93c would increase.

A positive input pulse 94' at 93e, however, will cause tive pulse 94' as indicated above. This positive pulse 93' to drop and hence prematurely terminates the RC action. The positive pulse 93' produced at output 93f thus terminates at a time coinciding with the beginning of the positive pulse 94' as indicated above. This positive pulse 93' is applied to inverter 95 as also stated above.

Inverter 95 comprises transistor pair 95Qa–95Qb having inputs 95a and 95b normally at a low level whereby output 95c normally is at a high level. The positive pulse 93' applied to input 95a causes transistor 95Qa to conduct, thereby producing a negative output at terminal 95c which is applied to input 94b of amplifier 94 as indicated above.

Sweep gate multivibrator 92 is similar to mulivibrator 93. Its multivibrator action is initiated by a pulse coincident with the leading edge of pulse 90'. Pulse 94' prematurely terminates the multivibrator action whereby pulse 92' terminates at the same time that the pulse 93' terminates.

Multivibrator 102 is similar to multivibrator 93 except that one of its inputs 102e is coupled to ground. The multivibrator action is initiated by pulse 94' whereby multivibrator 102 produces a pulse 102' whose width is determined by the time constant of capacitor $C_{102}$ and resistor $R_{102}$.

The sweep generator 96 may be of the type illustrated as comprising a large resistor 110, a capacitor 111, and a silicon-controlled rectifier 112 whose anode is connected to the junction of resistor 110 and capacitor 111 and whose gate is coupled to multivibrator 92 by way of inverter 113. A relatively high voltage is applied to the upper end of resistor 110. The voltage applied to the gate of the SCR from the inverter 113 causes the SCR to be normally ON whereby the output across the SCR normally is zero. Pulse 92', when inverted and applied to the gate of the SCR, turns the SCR OFF whereby the potential across the capacitor 111 begins to build up during the duration of pulse 92'.

The peak detector 98 may be of the type described on page 148 of the publication Fairchild Semiconductor Linear Integrated Circuits Applications Handbook, James N. Giles, Library of Congress Catalog No. 67–27446. The output of this detector is a D-C voltage which is equal to $k\Delta T$ and hence is proportional to $\Delta T$ as indicated by curve 116 in FIG. 2. This output is applied to the inverting input of amplifier 99 which may be an operational amplifier well known in the art. A bias voltage equal to K is applied to the noninverting input of amplifier 99. Amplifier 99 thus inverts $k\Delta T$ as reflected by curve 118 of FIG. 2. The output of amplifier 99 is the sum of D-C voltage 118 and bias voltage K. Thus, its output is a voltage equal to $K-k\Delta T$. This voltage hence is a function of $\Delta T$ and varies inversely with $\Delta T$ as reflected by curve 54 in FIG. 2.

The embodiment disclosed above was described as suitable for carrying out logging operations in cased boreholes. In open hole logging, a magnetometer, rather than the potentiometer 30, will be employed in the borehole tool 13 and rotated by the motor 15. The magnetometer and associated circuitry will produce a pulse every time the transducer 14 rotates past magnetic north. Such a system and arrangement is described in the aforementioned U.S. Pat. No. 3,369,626. This magnetometer signal will be transmitted uphole and employed to trigger a sweep generator, the ouput of which will be applied to the horizontal deflection plate of the oscilloscope 52. Thus, the trace 56 will begin at magnetic north.

Figure 8:
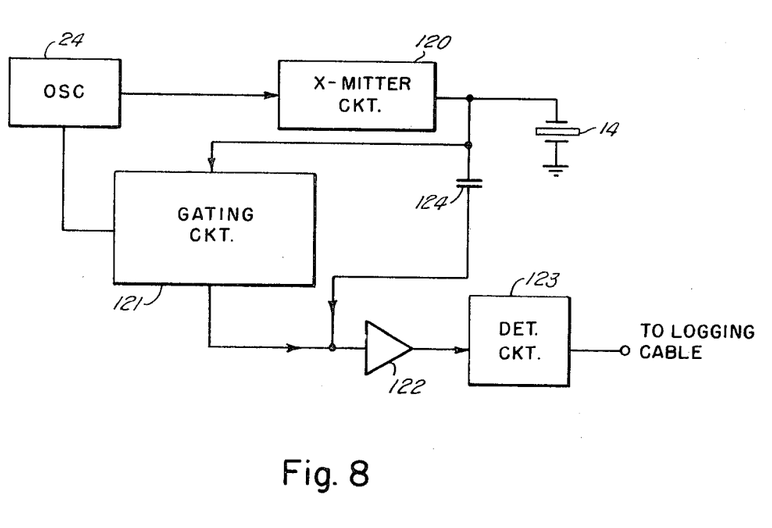
FIG. 8 illustrates in more detail certain components of the logging tool.

Referring to FIG. 8, the sync-signal-producing system now will be described. As shown, the oscillator 24 triggers a transmitter circuit 120 to excite the transducer 14. The transmitter pulse crossfeed is minimized by use of a gating circuitry 121 which blocks the crossfeed and amplifies the received signal. The output of circuitry 121 is amplified at 122 and applied to a detector circuit 123 to form the envelope of the reflected signal received.

In order to obtain a sync pulse, the signal produced by the transducer 14, when it fires, is attenuated to a low level by the combination of capacitor 124 and the input impedance of amplifier 122 and then is applied to detector 123 where its envelope is formed.

Referring again to FIG. 1, there will be described briefly the system employed for vertically stepping the trace 56 produced upon each rotation of transducer 14. This system comprises a potentiometer 130, the arm of which is mechanically coupled through gear reducer 131 to reel 132 driven by the logging cable 43. As the cable 43 is moved continuously to move the tool 13 through the borehole, the contact of the potentiometer 130 moves across the resistance element, thereby generating a slowly changing sweep voltage which is applied to the vertical deflection plate of the oscillosocope 52. The inclined trace indicates the continuous change in depth of the logging tool. Each trace will begin at a height substantially where the preceding trace terminated.

What is claimed is:

1. In a system for obtaining data within a borehole having fluid therein and a reflecting interface between said fluid and the material confining said fluid in said borehole, said system including:

an elongated borehole tool for insertion into a borehole and having acoustic transmitting and receiving means adapted to be rotated about the longitudinal axis of said tool and hence the axis of said borehole, said acoustic transmitting and receiving means being operable to produce pulses of acoustic energy periodically for exploratory purposes and to detect acoustic energy reflected from said interface for the production of reflection signals, a utilization device including a visual recording medium for sequentially recording in variable-density form data representing the output of said transmitting and receiving means detected through 360° of rotation of said transmitting and receiving means in said borehole, the combination therewith of:

means for employing said reflection signals for periodically producing amplitude signals having an amplitude which is a function of the time between the production of said pulses of acoustic energy and the detection of reflected acoustic energy, and means for applying said amplitude signals to said utilization device for producing a record whose intensity varies in accordance with the amplitude of said amplitude signals to form a display of the three dimensional configuration of said interface.

2. In a system for obtaining data within a borehole having fluid therein and a reflecting interface between said fluid and the material confining said fluid in said borehole, said system including:

an elongated borehole tool for insertion into a borehole and having acoustic transmitting and receiving means adapted to be rotated about the longitudinal axis of said tool and hence the axis of said borehole, said acoustic transmittting and receiving means being operable to produce pulses of acoustic energy periodically for exploratory purposes and to detect acoustic energy reflected from said interface for the production of reflection signals, a display device including deflection means for controlling the movement of an electron beam for the production of a trace pattern on a display medium once for each rotation of said transducer, and modulating means for modulating the intensity of said electron beam, the combustion therewith:

means for employing said reflection signals for periodically producing modulating signals having an amplitude which is a function of the time between the production of said pulses of acoustic energy and the detection of reflected acoustic energy, and means for applying said modulating signals to said modulating means for modulating the intensity of said electron beam and hence the intensity of said trace pattern in accordance with the amplitude of said modulating signals whereby there may be formed a display of the three-dimensional configuration of said interface.

3. In a system for obtaining data within a borehole having fluid therein and a reflecting interface between said fluid and the material confining said fluid in said borehole, said system including:

an elongated borehole tool for insertion into a borehole and having acoustic transmitting and receiving means adapted to be rotated about the longitudinal axis of said tool and hence the axis of said borehole, said acoustic transmitting and receiving means being operable to produce pulses of acoustic energy periodically for exploratory purposes and to detect acoustic energy reflected from said interface, a display device including deflection means for controlling the movement of an electron beam for the production of a trace pattern on a display medium once for each rotation of said transducer, and modulating means for modulating the intensity of said electron beam, the combination therewith of:

means for periodically producing signals having an amplitude which is a function of the time between the production of said pulses of acoustic energy and the detection of reflected acoustic energy, and means for applying said signals to said modulating means for the production of an electron beam which has an intensity which is an inverse function of the time between the production of said pulses of acoustic energy and the detection of reflected acoustic energy whereby there may be formed a display of the three-dimensional configuration of said interface.

4. The system of claim 3 wherein:

the amplitude of said signals is an inverse function of the time between the production of said pulses of acoustic energy and the detection of reflected acoustic energy.

5. In a system for obtaining data within a borehole having fluid therein and a reflecting interface between said fluid and the material confining said fluid in said borehole, said system including:

an elongated borehole tool for insertion in to a borehole and having acoustic transmitting and receiving means adapted to be rotated about the longitudinal axis of said tool and hence the axis of said borehole, said acoustic trnsmitting and receiving means being operable to produce bursts of acoustic energy periodically for exploratory purposes and to detect acoustic energy reflected from said interface.

a display device including deflection means to control the movement of an electron beam for the production of a substantially straight line trace across a display medium once for each rotation of said transducer, and modulating means for controlling the intensity of said electron beam, the method of operating said system comprising the steps of:

periodically operating said acoustic transmitting and receiving means for producing bursts of acoustic energy for application to said interface, detecting acoustic energy reflected from said interface, in response to said acoustic pulses produced and said acoustic energy detected, producing signals having amplitudes which are a function of the time between the production of said pulses of acoustic energy and the detection of reflected acoustic energy, and applying said signals to said display device to modulate the intensity of said electron beam and hence the intensity of said trace in accordance with the amplitude of said signals, said trace having brighter tones for shorter times and darker tones for longer times between the production of said pulses of acoustic energy and the detection of reflected acoustic energy whereby there may be formed a display of the three-dimensional configuration of said interface.

6. A method of recording data obtained from cyclic scanning operations carried out, with scanning means, angularly around the wall of a borehole at a plurality of points and at each of a plurality of different depths, comprising the steps of:

producing signals having a characteristics which is a function of the distance between said scanning means and the wall of said borehole at each scanning point, and applying said signals to a recording system to record a plurality of predetermined trace patterns on a two-dimensional recording medium to form a display of the three-dimensional configuration of the wall of the borehole and having visible tones which are representative of the distance between said scanning means and the wall of said borehole at each scanning point.

7. The method of claim 6 wherein:
said trace patterns are recorded in a manner to form brighter tones representative of shorter distances and darker tones representative of longer distances between said scanning means and the wall of said borehole.

8. A method of recording data obtained from cyclic scanning operations carried out, with scanning means, angularly around the wall of a borehole at a plurality of points and at each of plurality of different depths, comprising the steps of:
on a display medium, producing a trace pattern for each scanning cycle and having tones whose variations are representative of variations in the distance between said scanning means and the wall of said borehole at each scanning point, and
recording a plurality of said trace patterns on a two-dimensional recording medium to form a display of the three-dimensional configuration of the wall of said borehole.

9. A method of presenting data on a display medium of a display system having an elontron beam control means, said data being obtained from cyclic scanning operations carried out angularly around a borehole at each of a plurality of different depths wherein:
an energy transmitting and receiving means is rotated in said borehole and operated periodically during each cycle to transmit energy pulses toward the borehole wall and to detect reflected energy,
reflection signals are produced in response to reflected energy detected, and
sync pulses are produced each having a predetermined time relationship with respect to each energy pulse produced,
said method comprising the steps of:
from said sync pulses and reflection signals, producing an output having a characteristic which is a function of time betwen the production of said energy pulses and the detection of reflected energy,
applying said output to said electron beam control means to produce a trace pattern on said display medium for each scanning cycle and having tones which are a function of the time between the production of said energy pulses and the detection of reflected energy, whereby there may be formed a display of the three-dimensional configuration of said bore hole wall.

10. A system for recording data obtained from cyclic scanning operations carried out, with scanning means, angularly around a borehole at a plurality of points and at each of a plurality of different depths wherein signals are produced from the scanning operations carried out at each scanning point, comprising:
a recording system including a two-dimensional recording medium,
means for employing said signals for producing an output having a characteristic which is a function of the distance betwen said scanning means and a reflecting interface of interest at each scanning point, and
means for applying said output to said recording system to record a plurality of trace patterns on said two-dimensional recording medium to form a three-dimensional display of said reflecting interface and having tones whose variations are representative of the variations in distance between said scanning means and said reflecting interface at each scanning point.

11. A system for recording data obtained from cyclic scanning operations carried out, with scanning means, angularly around the wall of a borehole at a plurality of points and at each of a plurality of different depths, comprising:
a display system having a display medium,
means for controlling said display system for producing on said display medium a predetermined trace pattern for each scanning cycle and having tones which are representative of the distance between said scanning means and the wall of said borehole at each scanning point, and
means for recording a plurality of said trace patterns on a two-dimensional recording medium to form a display of the three-dimensional configuration of said borehole.

12. A system for producing useful trace patterns from data obtained from a cyclic scanning operations carried out angularly around the wall of a borehole at each of a plurality of different depths wherein:
an energy transmiting and receiving means is rotated in said borehole and operated periodically during each cycle to transmit energy pulses to the borehole wall and to detect energy reflected from said borehole wall,
reflection signals are produced in response to reflected energy detected, and
sync pulses are produced each having a predetermined time relationship with respect to each energy pulse produced,
said system comprising:
a display system having a display medium and an electron beam modulating means,
means responsive to said sync pulses and reflection signals for producing modulating signals having a characteristic which is a function of the time between the the production of said energy pulses and the detection of reflecting energy,
means for applying said modulating signals to said electron beam modulating means to intensity said electron beam with said signals, and
means for sweeping said electron beam in a predetermined trace pattern for each scanning cycle to produce a predetermined trace pattern on said display medium having tones which are a function of the time between the production of said energy pulses and the detection of reflected energy, whereby there may be formed a display of the three-dimensional configuration of said bore hole wall.

References Cited

UNITED STATES PATENTS 2,631,270  3/1953  Goble _______________ 340—18
3,093,810  6/1963  Gezer et al. ________ 340—15.5

RICHARD A. FARLEY, Primary Examiner

W. T. RIFKIN, Assistant Examiner

U.S. Cl. X.R.
73—67.5; 181—105

PO-1050
(5/69)

UNITED STATES PATENT OFFICE
CERTIFICATE OF CORRECTION

Page 1 c

Patent No. 3,550,075      Dated December 22, 1970

Inventor(s) Douglas W. Hilchie and Joseph Zemanek, Jr.

It is certified that error appears in the above-identified patent and that said Letters Patent are hereby corrected as shown below:

Column 2, line 59, "3,379,077" should read --3,378,097--.
Column 3, line 26, "signal" should be --signals--.
Column 4, line 9, after "form" insert --from--.
Column 5, line 51, cancel "tive pulse 94' as indicated above. This positive pulse 93' " and insert --transistor 93Qd to conduct. This causes the output at 93f--.
Column 7, line 45, after "therewith" and before the colon (:) insert --of--.
Column 8, line 26, "in to" should be --into--;
    line 72, "characteristics" should be --characterist (Original claim 7, line 5, added by Amendment "A" filed Sept. 15, 1969).
Column 9, line 18, before "plurality" insert --a-- (Original claim 9, line 4, added by Amendment "A" filed Sept. 15, 1969);
    line 30, "elontron" should be --electron-- (Original claim 10, line 2, added by Amendment "A" filed Sept. 15, 1969);
    line 46, after "function of" the phrase "time betwe should be --the time between-- (Original claim 10, line 18, added by Amendment "A" filed Sept. 15, 1969);
    line 68, "betwen" should be --between-- (Original claim 11, line 11, added by Amendment "A" filed Sept. 15, 1969).
Column 10, line 24, before "said borehole" insert --the wall (Original claim 12, line 14, added by Amendment "A" filed Sept. 15, 1969);
    line 26, before "cyclic" cancel "a" (Original claim 13, line 2, added by Amendment "A" filed Sept. 15, 1969);
    line 29, "transmiting" should be --transmitting-- (original claim 13, line 5, added by Amendment "A" filed Sept. 15, 1969);

PO-1050
(5/69)

UNITED STATES PATENT OFFICE
CERTIFICATE OF CORRECTION

Page 2 of

Patent No. 3,550,075      Dated December 22, 1970

Inventor(s) Douglas W. Hilchie and Joseph Zemanek, Jr.

It is certified that error appears in the above-identified patent and that said Letters Patent are hereby corrected as shown below:

Column 10, line 46, "reflecting" should be --reflected-- (Original claim 13, line 21, added by Amendment "A" filed Sept. 15, 1969);
line 64, Under REFERENCES CITED "Gezer et al" should be --Geyer et al--.

Signed and sealed this 30th day of March 1971.

(SEAL)
Attest:

EDWARD M. FLETCHER, JR.
Attesting Officer

WILLIAM E. SCHUYLER, JR.
Commissioner of Patents